(12) United States Patent
Boyd et al.

(10) Patent No.: US 7,061,405 B2
(45) Date of Patent: Jun. 13, 2006

(54) DEVICE AND METHOD FOR INTERFACING VIDEO DEVICES OVER A FIBER OPTIC LINK

(75) Inventors: Michael R. Boyd, Saline, MI (US); Jason J. Beaudoin, Plymouth, MI (US); Vincent Mui, Livonia, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/966,823

(22) Filed: Oct. 15, 2004

(65) Prior Publication Data

US 2006/0082476 A1   Apr. 20, 2006

(51) Int. Cl.
*H03M 7/00* (2006.01)
(52) U.S. Cl. .......................................... 341/50; 341/51
(58) Field of Classification Search ................. 341/50, 341/51
See application file for complete search history.

(56) References Cited

U.S. PATENT DOCUMENTS

| | | | | |
|---|---|---|---|---|
| 4,363,036 A | * | 12/1982 | Subramaniam | 382/238 |
| 4,630,043 A | | 12/1986 | Haubner et al. | |
| 5,793,420 A | | 8/1998 | Schmidt | |
| 5,978,762 A | * | 11/1999 | Smyth et al. | 704/229 |
| 6,389,340 B1 | | 5/2002 | Rayner | |
| 6,950,889 B1 | * | 9/2005 | Ishida et al. | 710/65 |
| 2003/0118352 A1 | * | 6/2003 | Choudhary et al. | 398/188 |
| 2004/0049789 A1 | | 3/2004 | Bower et al. | |

FOREIGN PATENT DOCUMENTS

| | | |
|---|---|---|
| EP | 1 068 997 | 7/2000 |
| GB | 2 310 114 | 2/1996 |
| JP | 2003163926 | 6/2003 |

* cited by examiner

*Primary Examiner*—Rexford Barnie
*Assistant Examiner*—Joseph Lauture
(74) *Attorney, Agent, or Firm*—Harness, Dickey & Pierce, P.L.C.

(57) ABSTRACT

A system and method for interfacing video devices over a link where electronic digital video data having a quantity (n) of bits of parallel data transmitted electronically at a first clock rate ($R_1$) is converted to a stream of electronic serial data that is transmitted a second clock rate ($R_2 = R_1 \times n$). The stream of electronic serial data is transmitted over a link that can be a fiber optic link or include one or more conductors. A receiver is employed to convert the data transmitted over the link into an output data stream having (n) bits of parallel data transmitted electronically at the first clock rate ($R_1$). If the link is a fiber optic link, the receiver can convert the data transmitted over the link into to a second stream electronic serial data that is transmitted at the second clock rate ($R_2$) and then to the output data stream.

17 Claims, 9 Drawing Sheets

DEVICE AND METHOD FOR INTERFACING VIDEO DEVICES OVER A FIBER OPTIC LINK

The present invention generally relates the transmission of data signals and more particularly to the transmission of video data signals over a link, such as a fiber optic link.

It is increasingly common for vehicles to be equipped with various video devices, such as internal and/or external cameras, video players, game systems, multimedia displays and/or navigational displays, that transmit video signals to and/or receive video signals from remote locations within the vehicle. In addition, the camera or graphics video data may be transmitted to modules for processing to provide information about the vehicles occupants (e.g. monitor passengers, driver alertness, etc.) or about the surroundings (e.g., night vision, collision avoidance, lane departure, etc.). Modernly, the network that couples the video transmitting and video receiving components in a vehicle includes a copper wire (co-axial cable or twisted pair) that is employed to transmit the video data in accordance with a predetermined standard, such as LVDS. The networks typically require a protocol layer, such as MOST, 1394, or USB, and require that the video data be compressed due to the high bandwidth of uncompressed video data and network system limitations. Such systems have several drawbacks, however.

One drawback concerns the use of copper wire for transmitting video signals. The copper wire is relatively heavy, expensive and can be less flexible (i.e. cable bend radius) than other signal carriers, such as fiber optic cabling. Furthermore, the bandwidth of the copper wire varies inversely with its length, it can emit and/or be susceptible to EMI, and modules directly connected can have issues related to different ground potentials.

There are also drawbacks related to the use of standard protocol networks. More specifically, standard protocol networks typically require data compression which degrades the video quality. Consequently, they are limited in the flexibility of the data that they are able to transmit and their cost reflects the need for compressors and data buffers. Moreover, compression and the protocol overhead tends to add a period of latency to the overall transmission and receive cycles. Even without data compression, there is an additional system cost related to the interface electronics required to implement the protocol and a loss of transmission bandwidth due to the protocol overhead.

SUMMARY

In one form, the present teachings provide a method that includes: providing a stream of electronic digital data having a quantity (n) of bits of parallel data transmitted electronically at a first clock rate ($R_1$), the quantity (n) being greater than or equal to 2; transforming the stream of electronic digital data in at least one loss-less compression operation into a first stream of electronic serial data that is electronically transmitted at a second clock rate ($R_2$), wherein ($R_2$)=($R_1$)×(n), the stream of electronic digital data being transformed without formatting the data for use with a protocol; and transmitting the data in a serial stream over a link; converting the data transmitted over the link in a serial stream in at least one loss-less de-compression operation into an output stream of electronic digital data having the quantity (n) of bits of parallel data transmitted electronically at the first clock rate ($R_1$).

In another form, the teachings of the present invention provide a method for interfacing devices over a fiber optic link that includes providing an input data stream having a quantity (n) of bits of parallel data transmitted electronically at a first clock rate ($R_1$), the quantity (n) being greater than or equal to 2; converting the input data stream into a serial data stream, the serial data stream including serial data transmitted electronically at a second clock rate ($R_2$), wherein ($R_2$)=($R_1$)×(n), the input data stream being converted without formatting the data for use with a protocol; converting the serial data stream into an optical data stream, the optical data stream including optically serial data; and transmitting the optical data stream over a fiber optic link.

In yet another form, the teachings of the present invention provides a method for interfacing devices over a fiber optic link that includes: optically transmitting an optical data stream over a fiber optic link, the optical data stream including serial data transmitted optically at a first clock rate ($R_1$); converting the optical data stream into a serial data stream, the serial data stream including serial data transmitted electronically at the first clock rate ($R_1$); and converting the serial data stream into an output data stream having a quantity (n) of bits of parallel data transmitted electronically at a second clock rate ($R_2$), the quantity (n) being greater than or equal to 2; wherein ($R_1$)=($R_2$)÷(n).

In a further form, the teachings of the present invention provide a system that includes a data transmitter and a data receiver. The data transmitter is configured to receive an input stream of electronic digital data having a quantity (n≧2) of bits of parallel data transmitted electronically at a first clock rate ($R_1$). The data transmitter transforms the stream of electronic digital data in at least one loss-less compression operation into a stream of electronic serial data that is electronically transmitted at a second clock rate ($R_2$) where ($R_2$)=($R_1$)×(n) and which is configured to be transmitted over a link. The data receiver is configured to receive the data transmitted over the link and to convert the data in at least one loss-less de-compression operation into an output stream of electronic digital data having the quantity (n) of bits of parallel data transmitted electronically at the first clock rate ($R_1$).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1A:
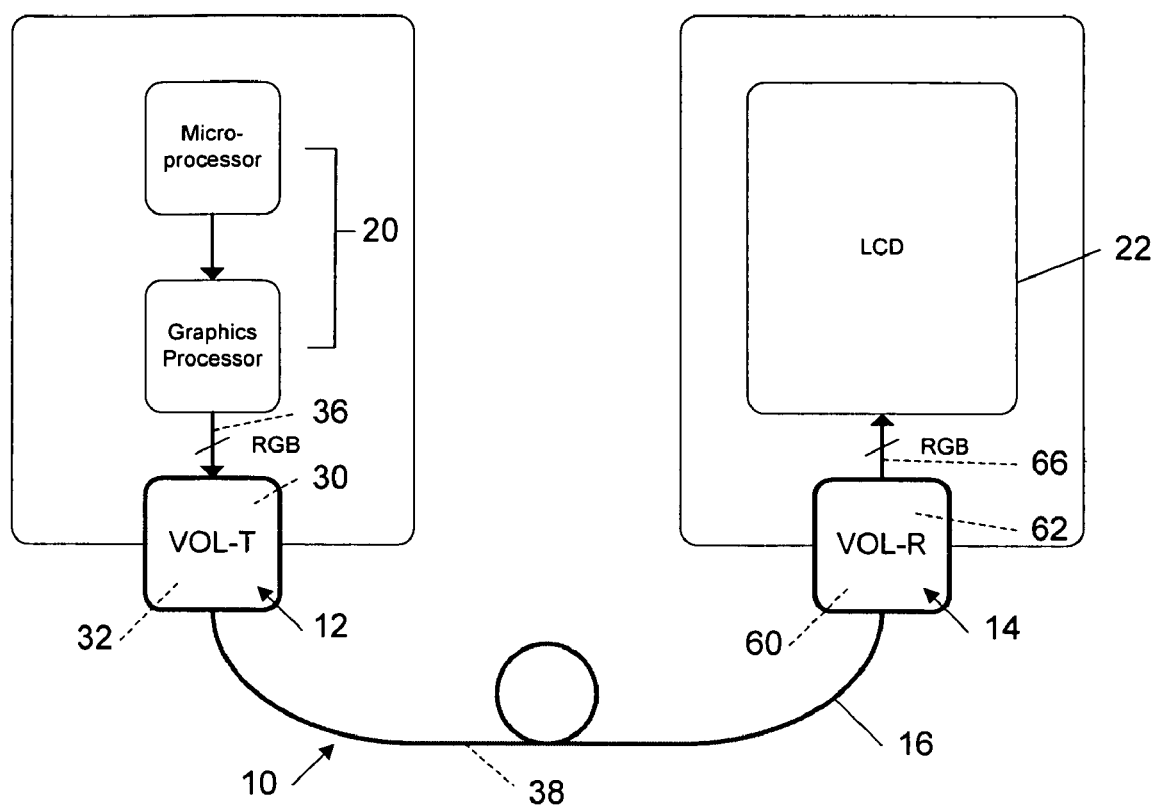
FIG. 1A is a schematic illustration of an exemplary system for interfacing video devices over a fiber optic link constructed in accordance with the teachings of the present invention.
Figure 1B:
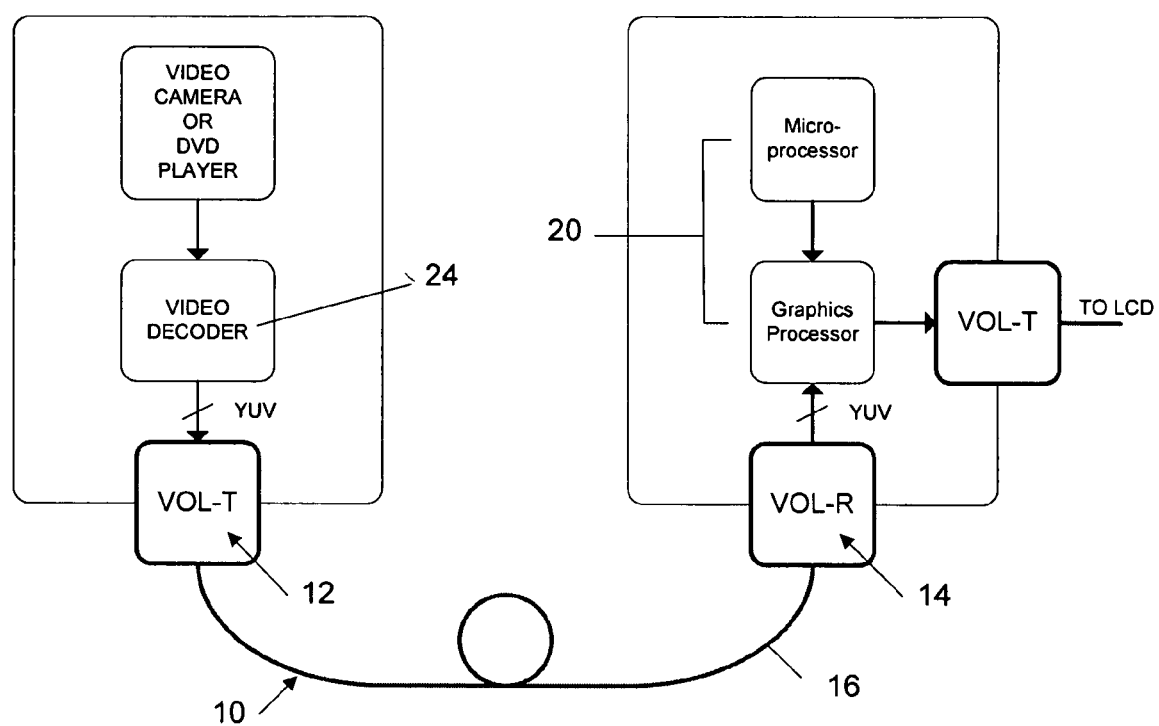
FIG. 1B is a schematic illustration of a second exemplary system for interfacing video devices over a fiber optic link constructed in accordance with the teachings of the present invention.
Figure 1C:
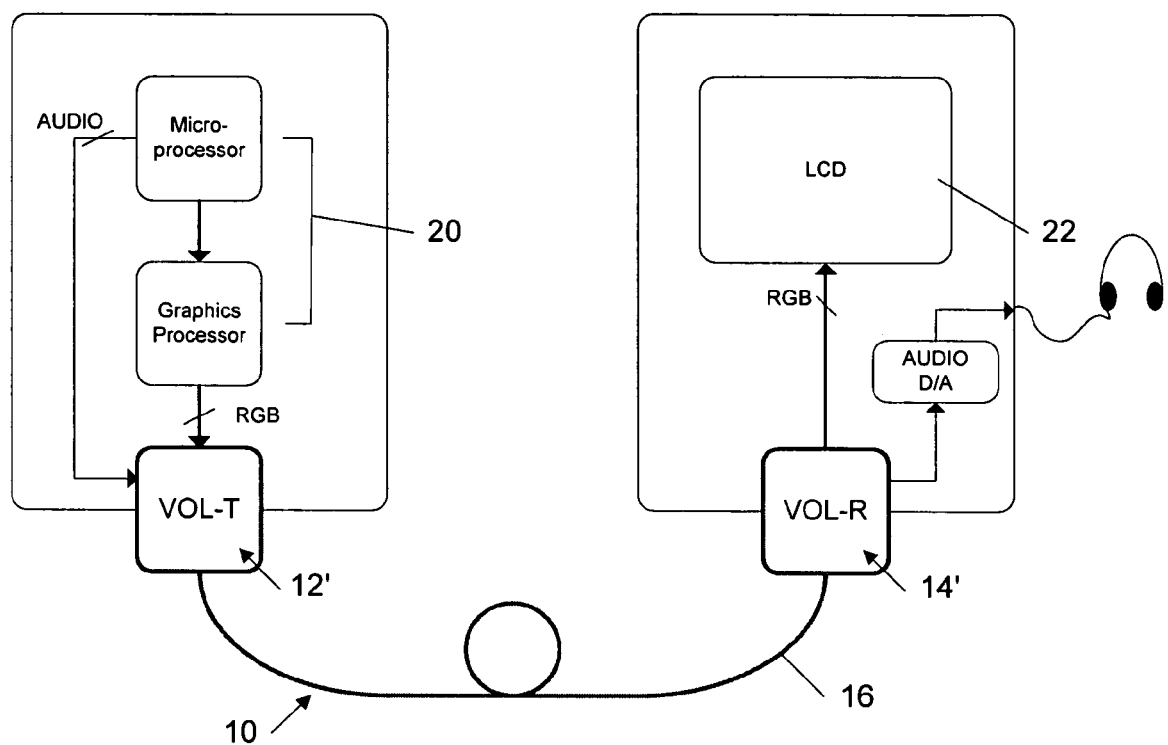
FIG. 1C is a schematic illustration of a third exemplary system for interfacing video devices over a fiber optic link constructed in accordance with the teachings of the present invention.

With reference to FIG. 1A of the drawings, a system for interfacing video devices over a fiber optic link constructed in accordance with the teachings of the present invention is generally indicated by reference numeral 10. The system 10 can include a transmitter 12 and a receiver 14 that are connected via a fiber optic link 16. In the particular example illustrated, the system 10 can be integrated into a vehicle (not shown) and couples a processor 20 to a remotely located display 22 to permit video data to be transmitted therebetween. FIGS. 1B and 1C illustrate other exemplary applications of the system 10. In FIG. 1B, the system 10 couples a video decoder 24, which can receive an input from a video camera, a game system, or a DVD player, for example, to a processor 20. The video encoder 24 is optional if the camera can output parallel digital video data in a known format (e.g. raw RGB, digital YUV, etc.). The embodiment of FIG. 1C is similar to that of FIG. 1A, except that transmitter 12' and the receiver 14' are configured to transmit and receive, respectively, data over the fiber optic link 16 that includes both a video component and an audio component.

Returning to FIG. 1A, the transmitter 12 can include a first portion 30 and a second portion 32. The first portion 30 can be configured to receive an input data stream of electronic digital data 36 having a quantity (n≧2) of bits of parallel data transmitted electronically at a first data rate ($R_1$) and to transform the input data stream 36 in at least one loss-less compression operation into a stream of electronic serial data that is electronically transmitted at a second clock rate ($R_2$) wherein ($R_2$)=($R_1$)×(n). The input data stream 36 may be formatted in any suitable manner, including an RGB format, a YUV format, a YIQ format or any digital video data in any color space or format. The second portion 32 can be configured to convert the stream of electronic serial data into a stream of serial data 38 and transmitting the stream of serial data 38 over the fiber optic link 16.

Figure 2:
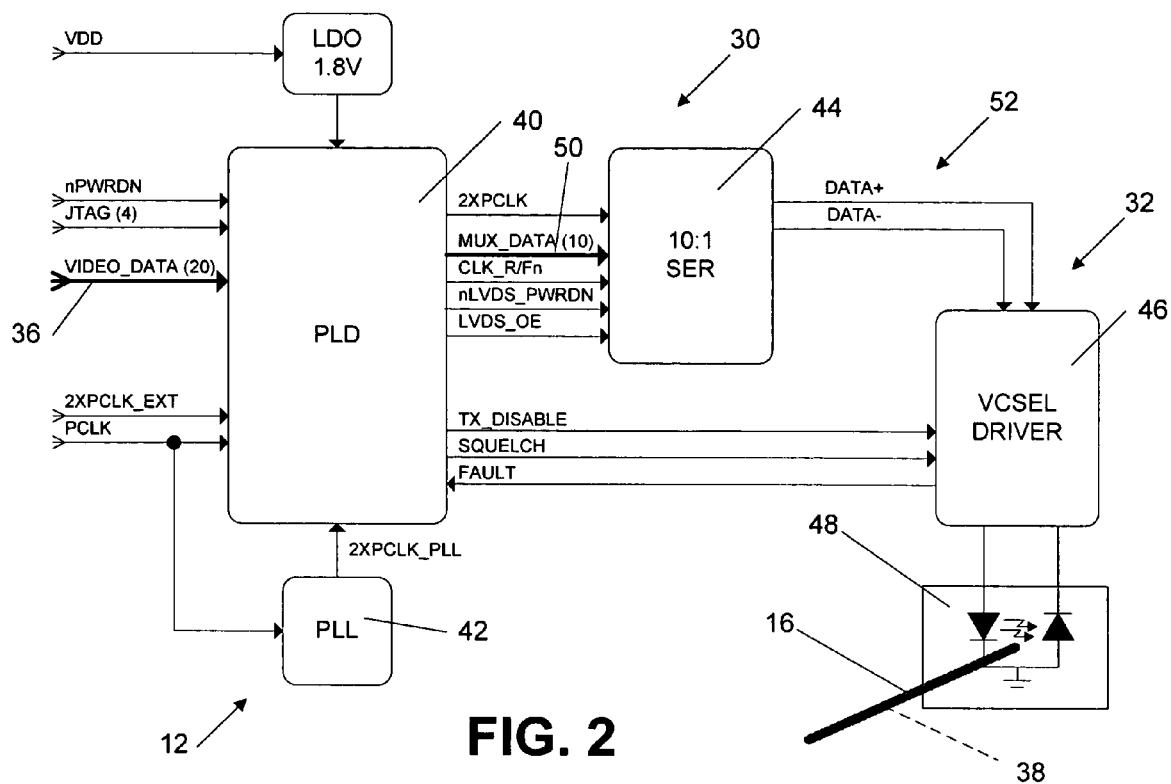
FIG. 2 is a schematic illustration of a portion of the system of FIG. 1A illustrating a portion of the transmitter.

With reference to FIG. 2, the first portion 30 of the transmitter 12 can include a programmable logic device (PLD) 40, a phase-locked loop (PLL) 42, a serializer 44 and the second portion 32 can include a vertical cavity surface emitting laser (VCSEL) driver 46 and a VCSEL optical transmitter 48. In the particular example provided, the PLL 42 multiplies the input clock speed by a predetermined amount (y) and the PLD 40 performs a first MUX operation on the input data stream 36 that combines the (n) bits of parallel data into an intermediate stream of electronic digital data 50 having (m) bits of parallel data that are transmitted at an intermediate clock rate ($R_i$). The clock multiplier (y) is equal to the number of parallel data bits in the input data stream; divided by the number of bits in the intermediate data stream; y=n/m. The intermediate clock rate ($R_i$) is equal to ($R_1$)×(y).

The intermediate stream of electronic digital data 50 can be transmitted to the serializer 44 that can perform a second MUX operation in which the intermediate stream of electronic digital data 50 is transformed into a stream of electronic serial data 52. The stream of electronic serial data 52 can be processed in the VCSEL driver 46 and converted into an electrical format to drive the VCSEL 48 to send serial data 38 over the fiber optic link 16.

The PLD 40 can perform one or more operations on the intermediate stream of electronic digital data, such as inserting a synchronization symbol, scrambling and/or encoding prior to the transformation of the intermediate stream of electronic digital data 50 into the stream of electronic serial data 52. In the example provided, the PLD 40 inserts a synchronization symbol with a predetermined bit pattern that provides a synchronization method for the de-MUX operation of the intermediate data in the receiver. The symbol may be inserted during the video blanking time or during one of the horizontal or vertical synch pulse available in RGB data so as to not increase the data rate. In the example provided, the PLD 40 also scrambles the parallel data and encodes the data so that the final serial stream will be DC balanced. A polynomial, such as $G1(X)=X^9+X^4+1$, can be employed for the data scrambling operation, while a Non Return to Zero Inverted (NRZ-I) algorithm, $G2(X)=X+1$, can be employed to encode the data. Certain input data patterns to the scrambler may cause the output stream to contain strings of static data (ones or zeroes) which will cause the data transmission system to fail due to the inability of the receiver to perform a clock and data recovery from the serial data stream. To prevent this failure, the PLD 40 may also alter the scrambled and encoded data in a known way (e.g. dithering one bit or sending random data patterns during blanking times, etc.) for transmission such that the original data can be recovered in the receiver.

Returning to FIG. 1A, the receiver 14 can include a first portion 60 and a second portion 62. The first portion 60 can be configured to receive the stream of serial data 38 from the fiber optic link 16 and convert it into a stream of electronic serial data that is electronically transmitted at the second clock rate ($R_2$). The second portion 62 can be configured to convert the stream of electronic serial data in at least one loss-less de-compression operation into an output data stream of electronic digital data 66 having the quantity (n) bits of parallel data that are transmitted electronically at the first clock rate ($R_1$). The output data stream 66 can be formatted in the manner in which the input data stream 36 is formatted.

Figure 3:
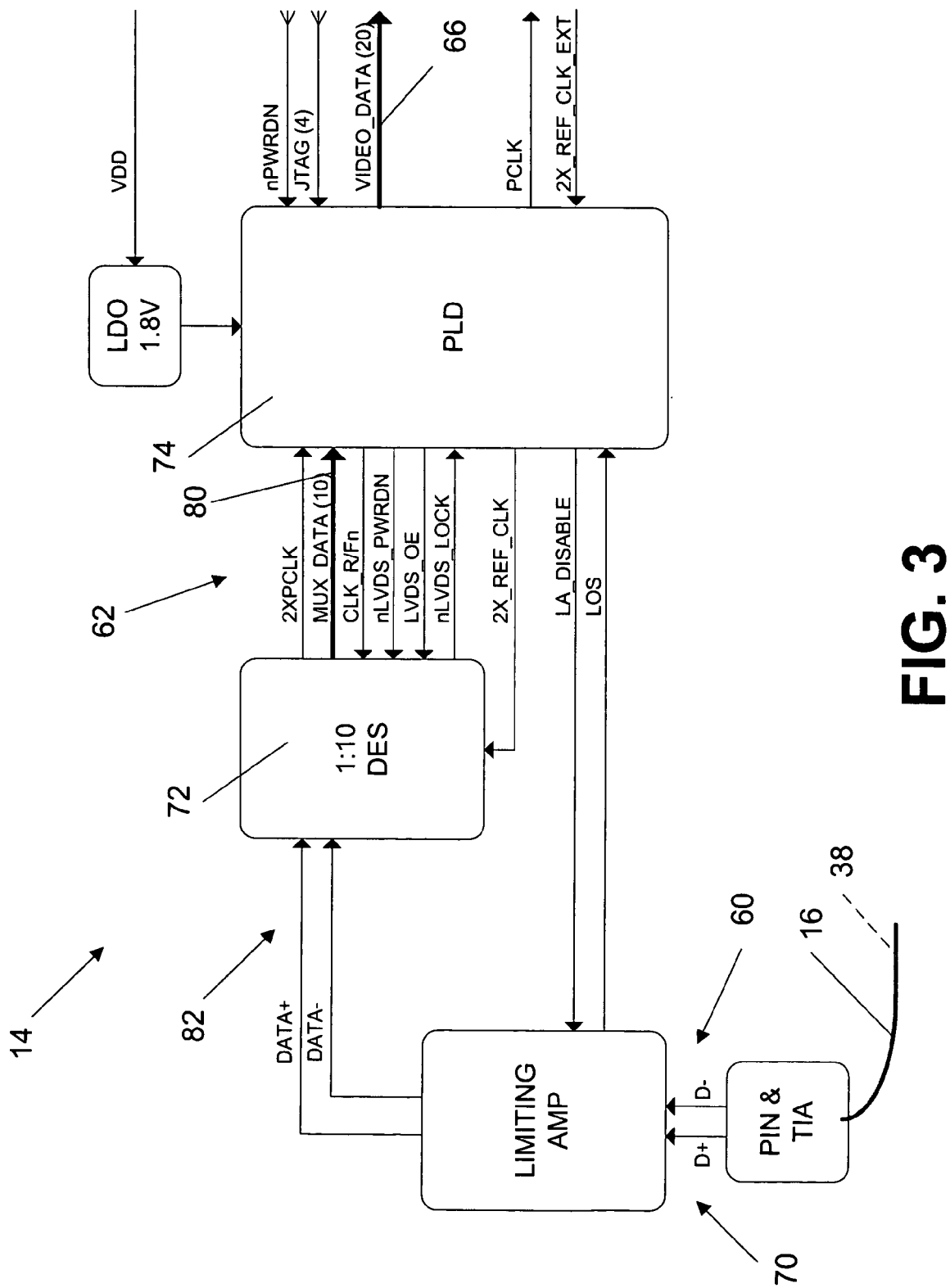
FIG. 3 is a schematic illustration of a portion of the system of FIG. 1A illustrating a portion of the receiver.

With reference to FIG. 3, the first portion 60 of the receiver 14 can include an optical receiver and amplifier 70 and the second portion 62 can include a de-serializer 72 and a PLD 74. The optical receiver and amplifier 70 can include a PIN diode photo detector, a preamplifier and a signal amplifier and can receive the stream of serial data 38 from the fiber optic link 16 and convert it into a stream of electronic serial data 82. The de-serializer 72 can receive the stream of electronic serial data 82 from the first portion 60 of the receiver 14 and can perform a clock and data recovery (CDR) operation which can synchronize the receiver to the incoming data stream so that the correct data and clock can be extracted followed by a first de-MUX operation on it that transforms the stream of electronic serial data 82 into an intermediate stream of electronic parallel data 80 that can have (m) bits of parallel data that are transmitted at the intermediate clock rate ($R_i$). The PLD 74 can receive the intermediate stream of electronic parallel data 80 and can perform a second de-MUX operation on it to transform the intermediate stream of electronic parallel data 80 into output data stream 66 that can have (n) bits of parallel data transmitted electronically at the first clock rate ($R_1$).

The PLD 74 can perform one or more operations on the intermediate stream of electronic digital data 80, such as decoding, unscrambling and/or removing a synchronization symbol, prior to the transformation of the intermediate stream of electronic digital data 80 into the output data stream 66. In the example provided, the PLD 74 decodes the data, de-scrambles the data and detects and removes the predetermined bit pattern from the intermediate stream of electronic digital data 80 prior to its conversion into the output stream 66. A Non Return to Zero Inverted (NRZ-I) algorithm, which can employ the polynomial $G2(X)=X+1$, can be employed for decoding, while an appropriate polynomial, such as $G1(X)=X^9+X^4+1$, can be employed for the data descrambling operation. The PLD 74 can also perform a data transformation if the original data was altered to prevent a serial stream of static data (ones or zeroes). In order to correctly recover the data in the second de-MUX operation, the PLD 74 must detect the synchronization symbol which is used to synchronize the transmitter MUX to the receiver de-MUX operation. PLD 74 will also divide down the intermediate clock signal to get the final data clock at rate (R1).

Figure 4:
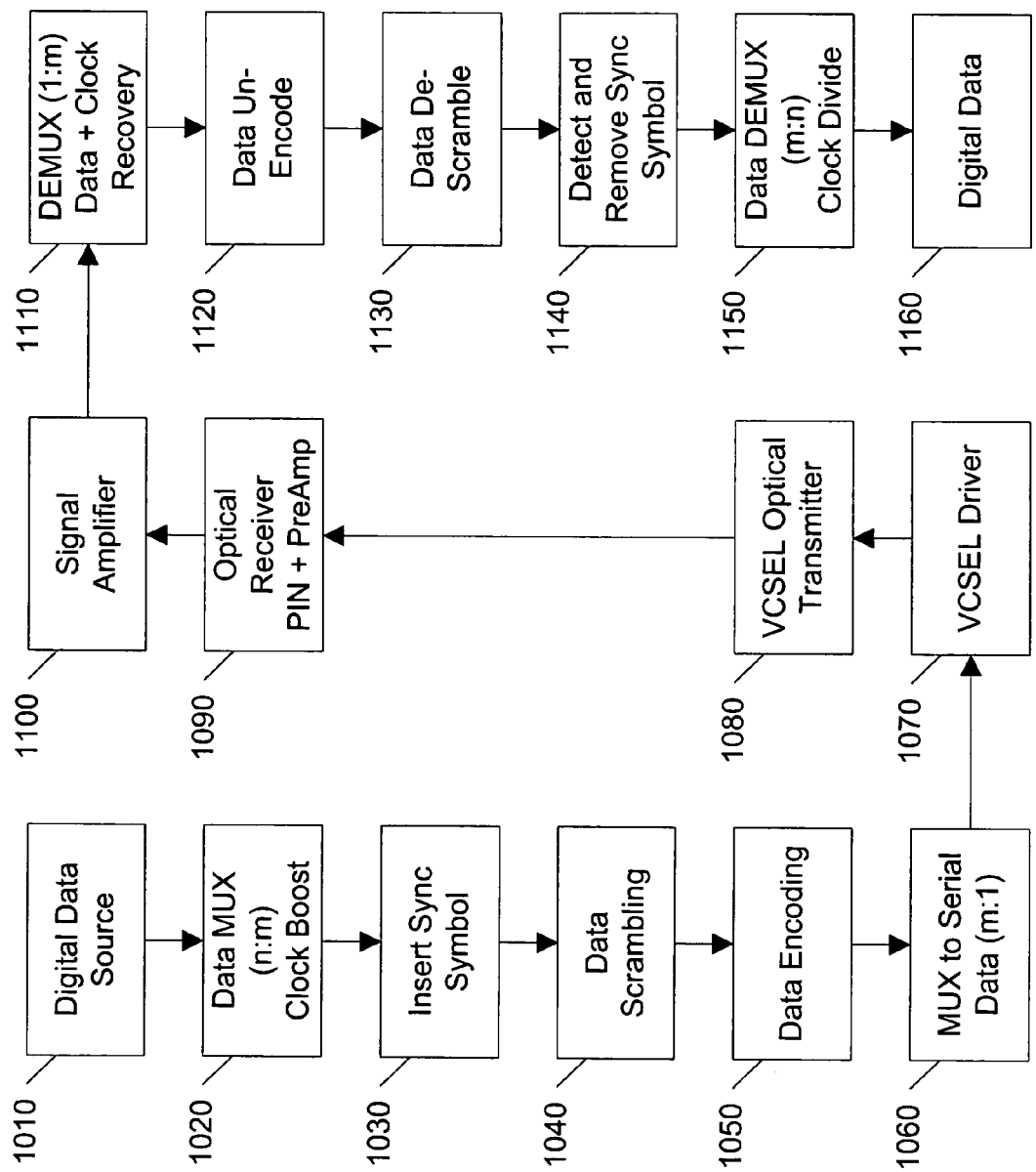
FIG. 4 is a schematic illustration of a method for interfacing video devices performed in accordance with the teachings of the present invention.

In FIG. 4, a method employing the teachings of the present invention is schematically illustrated. With additional reference to FIGS. 1A and 2, block 1010, the methodology can include the generation of the input data stream 36. The input data stream 36 can be transmitted to the transmitter 12, which can perform a first MUX operation as illustrated in block 1020, insert a synchronization symbol as illustrated in block 1030, scramble the data as illustrated in block 1040, encode the data as illustrated in block 1050, perform a second MUX on the data as illustrated in block 1060, format the data in a VCSEL driver as illustrated in block 1070 and optically transmit the stream of serial data 38 over the fiber optic link 16 as illustrated in block 1080.

With reference to FIGS. 1A, 3 and 4, the receiver can receive the stream of serial data 38 from the fiber optic link 16 as illustrated in block 1090, convert the stream of serial data 38 to a stream of electronic serial data 82 as illustrated in block 1100, perform a CDR and first de-MUX on the data as illustrated in block 1110, decode the data as illustrated in block 1120, de-scramble the data as illustrated in block 1130, detect and remove the synchronization symbol as illustrated in block 1140, perform a second de-MUX on the data as illustrated in block 1150 and output the output stream 66 as illustrated in block 1160.

From the foregoing, one of ordinary skill in the art will appreciate from this disclosure that the system 10 is configured to transmit digital video data (e.g. in RGB or YUV format) without an additional layer of protocol or packetization of the data. The original data being transmitted may be in any format or video data in any color space, including a data format with a protocol, but an additional protocol is not required to transmit the data over the serial data link. Because a transmission protocol is not employed, the data compression that is employed in typical video formats and the extensive processing power for handling the protocol is not needed. Consequently, the system 10 may employ a relatively small and inexpensive programmable logic device (PLD) whose configuration can preprocess the data with the MUX, insert the synchronization symbol for data recovery on the receiver side, and apply the scrambler in a parallel implementation.

While the system 10 and methodology have been described thus far as including multiple MUX operations and certain hardware, those of ordinary skill in the art will appreciate that the invention, in its broader aspects, may be constructed somewhat differently. For example, the transmitter 12 can be configured to convert the data in a single step, i.e., n:1, instead of in multiple steps, such as n:m and m:1. Similarly, the receiver 14 can be configured to convert the data in a single step, i.e., 1:n, instead of in multiple steps, such as 1:m and m:n. In addition, the insertion of the synchronization symbol on the transmitter is required in order to synchronize the MUX in the receiver 14, and may or may not be needed if the data is converted in a single step.

While the system 10 and methodology have been described thus far as including a data scrambling/descrambling and encoding/decoding operation and certain hardware, those of ordinary skill in the art will appreciate from this disclosure that the invention, in its broader aspects, may be constructed somewhat differently. The purpose of the scrambling and encoding stages is to increase the transition density of the resulting serial bit stream, with the goal of limiting the maximum run length of zeroes or ones. This process of DC balancing is required so that the receiver will be able to recover the clock and synchronize the data stream. The scrambler and encoder could be replaced by a symbol based encoding scheme such as 8B10B, 10B12B, etc or alternate scrambling polynomials could be used.

The system 10 and methodology have been described thus far as utilizing one directional operation that is based on certain hardware. Those of ordinary skill in the art will appreciate from this disclosure that the invention, in its broader aspects, may be constructed somewhat differently. For example, a multimode fiber may be employed with a transmitter and a receiver that each include an optical lens and a VCSEL and PIN photo detector pair to form a high speed bidirectional data link. A more typical application would be to have a high speed link in one direction for high bandwidth video data and a relatively lower speed link in the other direction for other signals (e.g., feedback and/or control data).

Figure 5:
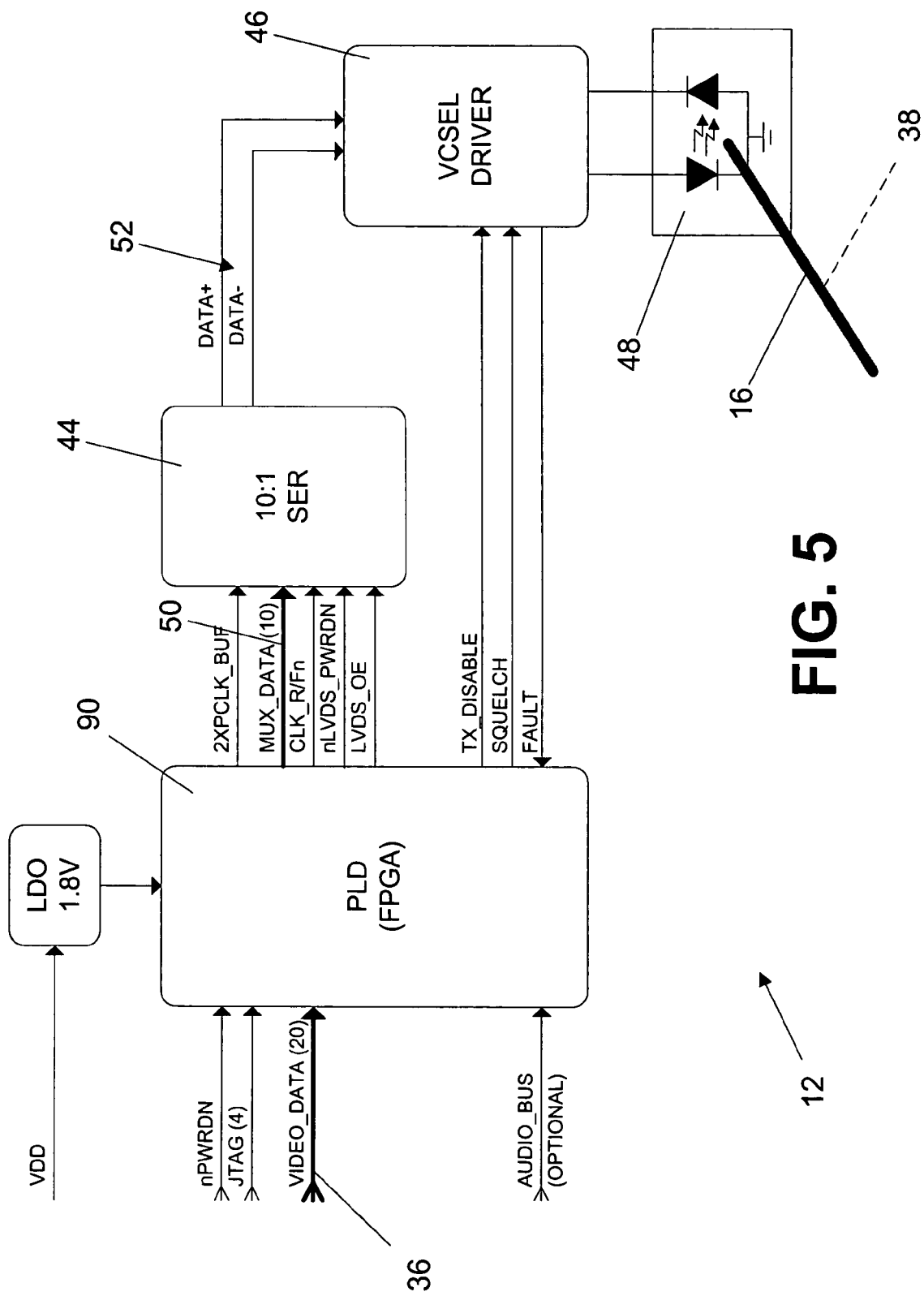
FIG. 5 is a schematic illustration of a second transmitter constructed in accordance with the teachings of the present invention.

In FIG. 5, a PLD of type Field Programmable Gate Array (FPGA) 90 with an internal PLL may be employed in lieu of the PLD 40 and PLL 42 that are illustrated in FIG. 2. The FPGA 90 includes additional resources that allow for the embedding of additional data, including control and/or audio signals, in a digital video data stream. The elimination of a separate PLL also helps to reduce the overall size of the transmitter 12.

Figure 6:
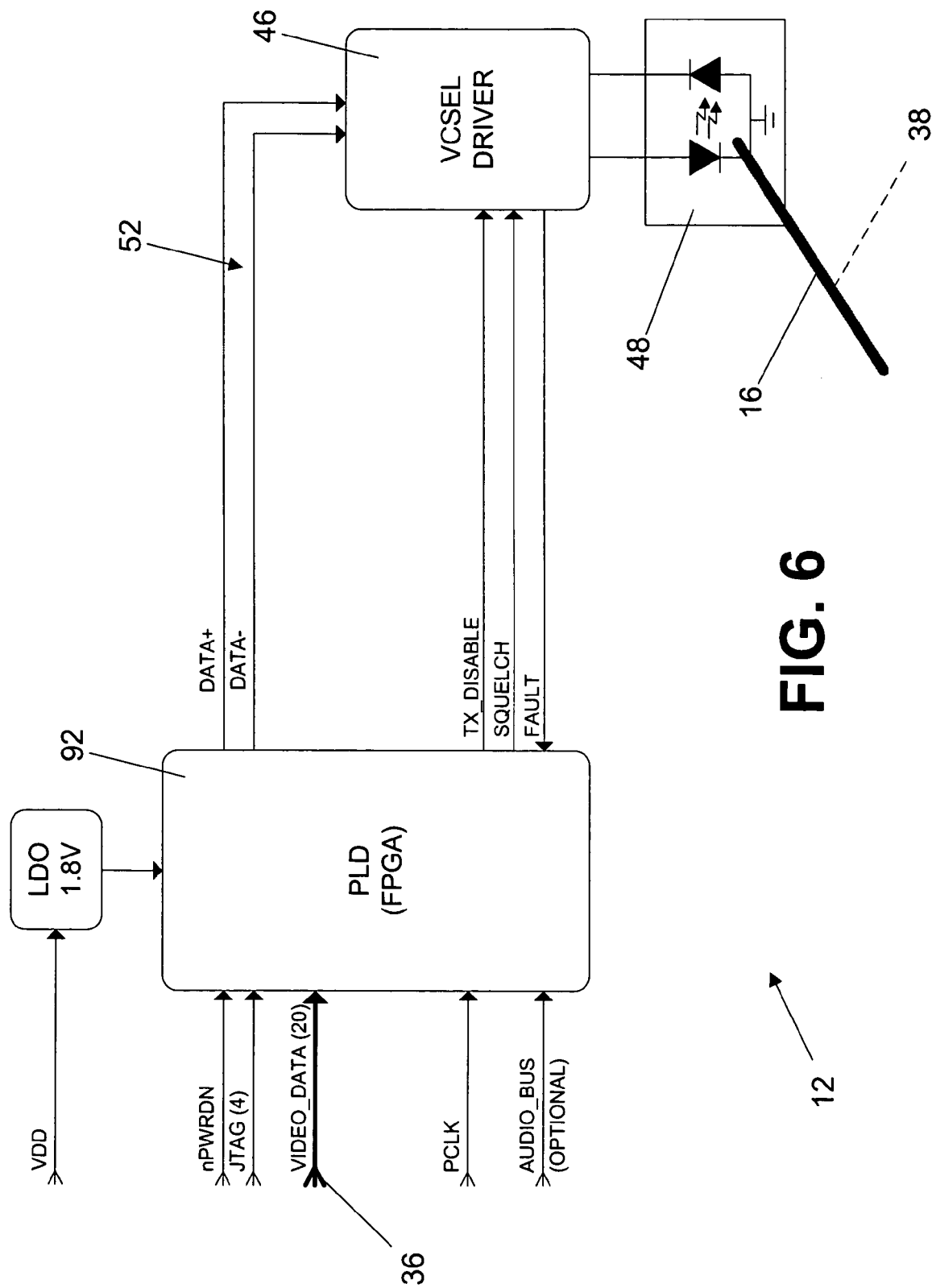
FIG. 6 is a schematic illustration of a third transmitter constructed in accordance with the teachings of the present invention.

In FIG. 6, a FPGA 92 with an internal PLL can be employed in lieu of the PLD 40, the PLL 42 and the serializer 44 that are illustrated in FIG. 2. In addition to the enhancements discussed above in conjunction with the embodiment of FIG. 5, the FPGA 92 can perform clock synthesis and serialization. Construction of the transmitter 12 in this manner eliminates a separate serializer to further reduce the overall size of the transmitter 12. Those of ordinary skill in the art will appreciate that the receiver 14 can also be constructed with an FPGA that can perform the deserialization, clock synthesis and data recovery operations that are performed by the de-serializer 72 and the PLD 74 illustrated in FIG. 3.

Figure 7:
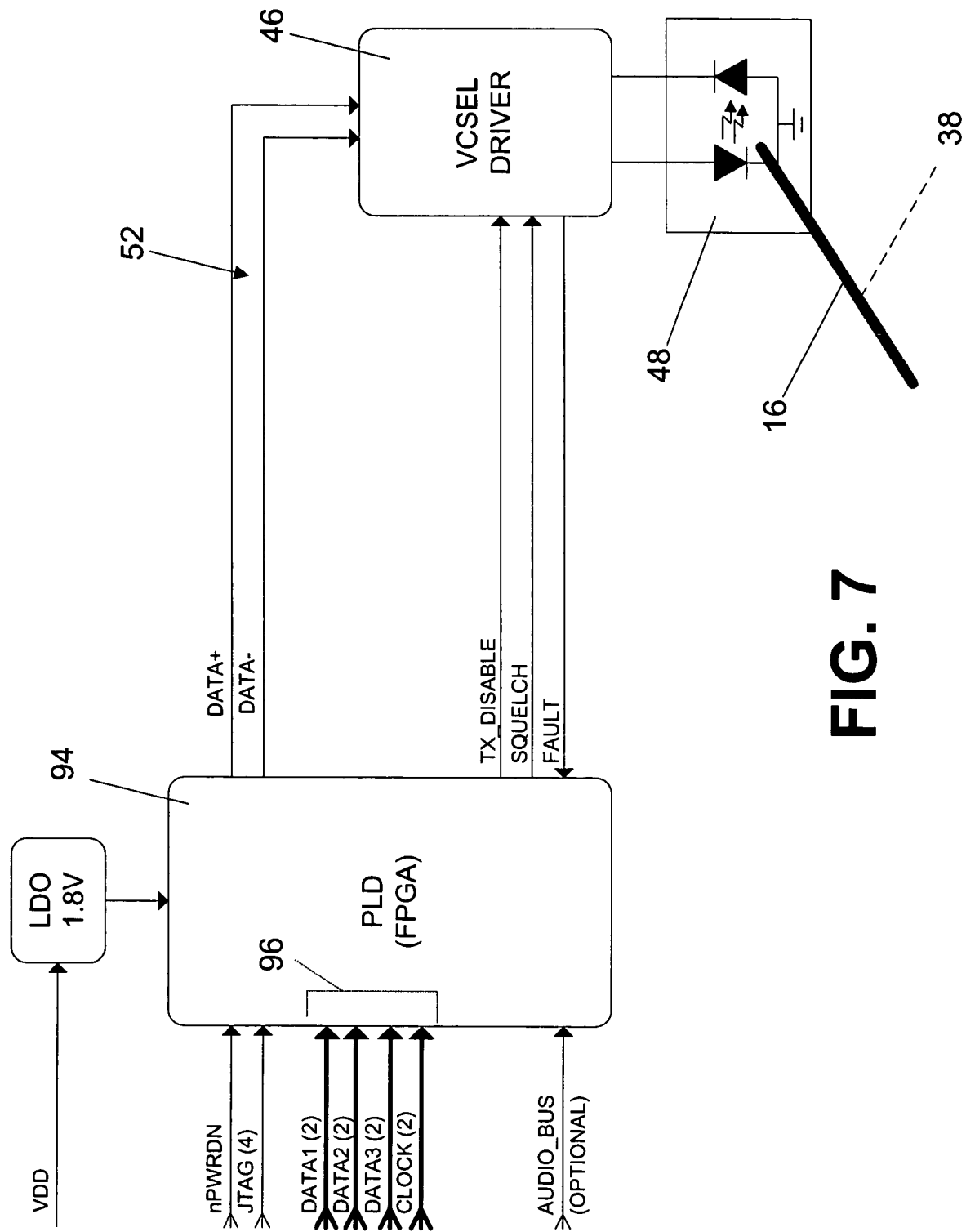
FIG. 7 is a schematic illustration of a fourth transmitter constructed in accordance with the teachings of the present invention.

The embodiment illustrated in FIG. 7 is similar to that which is illustrated in FIG. 6, except that the FPGA 94 includes a Low Voltage Differential Signaling (LVDS) interface 96 that permits the FPGA 94 to receive an LVDS input and thereby so that the number of I/O may be reduced relative to the embodiment of FIG. 6.

Systems and methods incorporating the teachings of the present invention can also include and/or be applied to other physical transmission media (e.g. replacing the fiber optic cable with a copper coaxial cable). For this implementation, the second portion 30 of the transmitter 32 could include a cable driver in addition to or in lieu of the VCSEL driver 46 and the VCSEL optical transmitter 48 and the first portion 60 of the receiver 14 could include a cable receiver circuit in addition to or in lieu of the optical receiver and amplifier 70.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method comprising:
providing a stream of electronic digital data having a quantity (n) of bits of parallel data transmitted electronically at a first clock rate ($R_1$), the quantity (n) being greater than or equal to 2;
transforming the stream of electronic digital data in at least one loss-less compression operation into a first stream of electronic serial data that is electronically transmitted at a second clock rate ($R_2$), wherein ($R_2$)= ($R_1$)×(n), the stream of electronic digital data being transformed without formatting the data for use with a protocol;
transmitting the data in a serial stream over a link;
converting the data transmitted over the link in a serial stream in at least one loss-less de-compression operation into an output stream of electronic digital data having the quantity (n) of bits of parallel data transmitted electronically at the first clock rate ($R_1$);
transforming the first stream of electronic digital data into an intermediate stream of electronic digital data having a quantity (m) of bits of parallel data transmitted electronically at an intermediate clock rate ($R_i$), wherein (n)<(m)≦2 and (m) is a factor of (n); and
transforming the intermediate stream of electronic digital data into the first stream of electronic serial data.

2. The method of claim 1, wherein transmitting the data in the serial stream over the link comprises:
converting the first stream of electronic serial data into the serial stream;
optically transmitting the serial stream over the link;
converting the serial stream received from the fiber optic link into a second stream of electronic serial data; and
transforming the second stream of electronic serial data into the output stream of electronic digital data.

3. The method of claim 1, wherein the intermediate stream of electronic digital data is processed in at least one operation selected from a group consisting of inserting a synchronization symbol, scrambling and encoding prior to its transformation into the stream of electronic serial data.

4. The method of claim 3, wherein a polynomial is employed in the scrambling operation.

5. The method of claim 4, wherein the polynomial is $X^9+X^4+1$.

6. The method of claim 3, wherein the encoding is a net return to zero-inverted (NRZ-I) encoding.

7. A method comprising:
providing a stream of electronic digital data having a quantity (n) of bits of parallel data transmitted electronically at a first clock rate ($R_1$), the quantity (n) being greater than or equal to 2;
transforming the stream of electronic digital data in at least one loss-less compression operation into a first stream of electronic serial data that is electronically transmitted at a second clock rate ($R_2$), wherein ($R_2$)= ($R_1$)×(n), the stream of electronic digital data being transformed without formatting the data for use with a protocol;
transmitting the data in a serial stream over a link; and
converting the data transmitted over the link in a serial stream in at least one loss-less de-compression operation into an output stream of electronic digital data having the quantity (n) of bits of parallel data transmitted electronically at the first clock rate ($R_1$);
wherein the link includes at least one conductor and the serial stream is the first stream of electronic serial data.

8. A method for interfacing devices over a fiber optic link comprising:
providing an input data stream having a quantity (n) of bits of parallel data transmitted electronically at a first data rate ($R_1$), the quantity (n) being greater than or equal to 2;
converting the input data stream into a serial data stream, the serial data stream including serial data transmitted electronically at a second data rate ($R_2$), wherein ($R_2$) =($R_1$)×(n), the input data stream being converted without formatting the data for use with a protocol;
converting the serial data stream into a stream of optical serial data; and
transmitting the stream of optical serial data over a fiber link;
wherein converting the input data stream into the serial data stream comprises:
transforming the input data stream into an intermediate stream of electronic digital data having a quantity (m) of bits of parallel data transmitted electronically at a clock rate ($R_i$), wherein (n)<(m)≦2, (m) is a factor of (n) and ($R_2$)<($R_i$)<($R_1$); and
transforming the intermediate stream of electronic digital data into the serial data stream.

9. The method of claim 8, wherein the intermediate stream of electronic digital data is processed in at least one operation selected from a group consisting of inserting a synchronization symbol, scrambling and encoding prior to its transformation into the serial data stream.

10. The method of claim 9, wherein a polynomial is employed in the scrambling operation.

11. The method of claim 10, wherein the polynomial is $X^9+X^4+1$.

12. The method of claim 9, wherein the encoding is a net return to zero-inverted (NRZ-I) encoding.

13. A method for interfacing devices over a fiber optic link comprising:

optically transmitting an optical data stream over a fiber optic link, the optical data stream including serial data transmitted optically;

converting the optical data stream into a serial data stream, the serial data stream including serial data transmitted electronically at a first clock rate ($R_1$); and converting the serial data stream into an output data stream having a quantity (n) of bits of parallel data transmitted electronically at a second data rate ($R_2$) wherein the quantity (n) being greater than or equal to 2 and wherein ($R_1$)=($R_2$)÷(n);

wherein converting the serial data stream into the output data stream comprises:

transforming the serial data stream into an intermediate stream of electronic digital data, the intermediate stream of electronic digital data having a quantity (m) of bits of parallel data transmitted electronically at an intermediate clock rate ($R_i$), wherein (n)<(m)≦2, (m) is a factor of (n) and ($R_1$)<($R_i$)<($R_2$); and transforming the intermediate stream of electronic digital data into the output data stream.

14. The method of claim 13, wherein the intermediate stream of electronic digital data is processed in at least one operation selected from a group consisting of removing a synchronization symbol, unscrambling and decoding prior to its transformation into the output data stream.

15. The method of claim 14, wherein a polynomial is employed in the unscrambling operation.

16. The method of claim 15, wherein the polynomial is $X^9+X^4+1$.

17. The method of claim 14, wherein the decoding is a net return to zero-inverted (NRZ-I) decoding.

* * * * *

UNITED STATES PATENT AND TRADEMARK OFFICE
CERTIFICATE OF CORRECTION

| | | |
|---|---|---|
| PATENT NO. | : 7,061,405 B2 | |
| APPLICATION NO. | : 10/966823 | |
| DATED | : June 13, 2006 | |
| INVENTOR(S) | : Boyd et al. | |

It is certified that error appears in the above-identified patent and that said Letters Patent is hereby corrected as shown below:

Column 8, line 12, "net" should be --non--.

Column 9, line 1, "net" should be --non--.

Column 10, line 16, "net" should be --non--.

Signed and Sealed this

Fifth Day of December, 2006

JON W. DUDAS
*Director of the United States Patent and Trademark Office*